(12) United States Patent
Song et al.

(10) Patent No.: US 11,568,240 B2
(45) Date of Patent: Jan. 31, 2023

(54) METHOD AND APPARATUS FOR CLASSIFYING CLASS, TO WHICH SENTENCE BELONGS, USING DEEP NEURAL NETWORK

(71) Applicant: Samsung Electronics Co., Ltd., Suwon-si (KR)

(72) Inventors: Hee-jun Song, Seoul (KR); Nilesh Kulkarni, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 604 days.

(21) Appl. No.: 16/613,317

(22) PCT Filed: May 16, 2018

(86) PCT No.: PCT/KR2018/005598
§ 371 (c)(1),
(2) Date: Nov. 13, 2019

(87) PCT Pub. No.: WO2018/212584
PCT Pub. Date: Nov. 22, 2018

(65) Prior Publication Data
US 2020/0097820 A1   Mar. 26, 2020

Related U.S. Application Data

(60) Provisional application No. 62/506,724, filed on May 16, 2017.

(30) Foreign Application Priority Data

May 15, 2018   (KR) ........................ 10-2018-0055651

(51) Int. Cl.
*G06N 3/08* (2006.01)
*G06F 40/30* (2020.01)
*G06N 3/04* (2006.01)

(52) U.S. Cl.
CPC ............... *G06N 3/08* (2013.01); *G06F 40/30* (2020.01); *G06N 3/0454* (2013.01)

(58) Field of Classification Search
CPC ........ G06N 3/08; G06N 3/0454; G06F 40/30; G06F 16/3347
See application file for complete search history.

(56) References Cited

U.S. PATENT DOCUMENTS

2003/0149558 A1* 8/2003 Holsapfel ............... G10L 13/10
704/4
2004/0236778 A1* 11/2004 Junqua .................... G06F 16/40
348/E5.103

(Continued)

FOREIGN PATENT DOCUMENTS

| KR | 10-2016-0069329 A | 6/2016 |
| KR | 10-2017-0011636 A | 2/2017 |
| WO | 2016/039751 A1 | 3/2016 |

OTHER PUBLICATIONS

H. Kamper, W. Wang and K. Livescu, "Deep convolutional acoustic word embeddings using word-pairside information," 2016 IEEE International Conference on Acoustics, Speech and Signal Processing (ICASSP), 2016, pp. 4950-4954, doi: 10.1109/ICASSP.2016.7472619. (Year: 2016).*

(Continued)

*Primary Examiner* — Daniel C Washburn
*Assistant Examiner* — Athar N Pasha
(74) *Attorney, Agent, or Firm* — Jefferson IP Law, LLP (57) ABSTRACT

Provided are a method and apparatus for classifying a sentence into a class by using a deep neural network. The method includes respectively training first and second sentences by using first and second neural networks, obtaining a contrastive loss based on first and second feature vectors generated as output data of the training, and information about whether classes to which the first and second sen- (Continued)

tences belong are the same, and repeating the training in such a manner that the contrastive loss has a maximum value.

13 Claims, 6 Drawing Sheets

(56) References Cited

U.S. PATENT DOCUMENTS

| | | |
|---|---|---|
| 2014/0025382 A1 | 1/2014 | Chen et al. |
| 2016/0092766 A1 | 3/2016 | Sainath et al. |
| 2016/0163310 A1 | 6/2016 | Lee et al. |
| 2016/0275119 A1* | 9/2016 | Iwamasa ................ G06Q 50/00 |
| 2016/0329047 A1 | 11/2016 | Tur |
| 2017/0025117 A1 | 1/2017 | Hong |
| 2017/0076152 A1* | 3/2017 | Asl ...................... G06N 3/0454 |
| 2017/0294186 A1 | 10/2017 | Pinto et al. |
| 2018/0174020 A1* | 6/2018 | Wu ...................... G06F 16/3344 |
| 2018/0247107 A1* | 8/2018 | Murthy ................ G06V 10/454 |
| 2018/0293499 A1* | 10/2018 | He .......................... G06N 3/088 |
| 2018/0329884 A1* | 11/2018 | Xiong .................. G06N 3/0454 |

OTHER PUBLICATIONS

Dong-Gun Lee et al., Measurement of Syntax Similarity between Korean Sentences Using RNN, Dept. of Computer Science, Korea Advanced Institute of Science and Technology, Jun. 4, 2016.

International Search Report and Written Opinion dated Nov. 5, 2018, issued in International Patent Application No. PCT/KR2018/005598.

Korean Office Action dated Apr. 30, 2019, issued in Korean Patent Application No. 10-2018-0055651.

Korean Notice of Allowance dated Nov. 28, 2019, issued in Korean Patent Application No. 10-2018-0055651.

* cited by examiner

FIG. 6

METHOD AND APPARATUS FOR CLASSIFYING CLASS, TO WHICH SENTENCE BELONGS, USING DEEP NEURAL NETWORK

TECHNICAL FIELD

The disclosure relates to a method and apparatus for classifying a question sentence into a class by structurally analyzing the sentence by using a deep neural network.

BACKGROUND ART

Artificial intelligence (AI) systems are computer systems for implementing human-level intelligence, and autonomously learn, make decisions, and get smarter unlike general rule-based smart systems. The more the AI systems are used, the more recognition rates of the AI systems increase and the more accurately the AI systems understand user preferences, such that the general rule-based smart systems are increasingly replaced by AI systems based on a deep neural network.

AI technology includes machine learning and element technologies using machine learning.

Machine learning is an algorithm technology for autonomously classifying and learning features of input data, and element technologies are technologies for mimicking functions of human brains, e.g., cognition and decision-making, by using a machine learning algorithm such as a neural network, and include technological fields such as linguistic understanding, visual understanding, inference/prediction, knowledge representation, and operation control.

AI technology enables recognition and application/processing of human languages/characters, and are also used for natural language processing (NLP), machine translation, dialog systems, question-answering, speech recognition/synthesis, etc. In question-answering systems using AI technology, a question sentence of a user is structurally analyzed to perform, for example, answer type, intent, and subject/verb analysis, and a suitable answer is found from a database based on the analysis result. A question-answering system for executing a command of a user analyzes an intent by classifying an utterance input by the user, and processes the command by finding independent entities.

Currently, customer care chatbots for analyzing questions of users and providing suitable answers, based on AI technology are being used. For the customer care chatbots, etc., analysis of a category, in which a user desires to be answered, based on analysis of an utterance of the user is critical. When pre-stored questions are not sufficient, the utterance of the user may be misclassified into a wrong category differently from the intent of the user. In this case, the user may not receive a desired answer.

DESCRIPTION OF EMBODIMENTS

Solution to Problem

Provided are a method and apparatus capable of increasing accuracy of classifying a first sentence, by additionally using a second neural network model when the first sentence is classified into a class by using a first neural network model.

Advantageous Effects of Disclosure

The disclosure provides a method and apparatus capable of not only training using a first neural network model with respect to classifying a first sentence into a first class, but also, by further using a second neural network model, determining a representational similarity between the first sentence and a second sentence by using a contrastive loss based on a first feature vector trained using the first neural network model, a second feature vector trained using the second neural network model, and information about whether the first class is the same as a second class. Therefore, the method and apparatus according to an embodiment of the disclosure may increase accuracy of text classification by using not only a label of a sentence or an utterance but also a semantic similarity to another sentence.

BRIEF DESCRIPTION OF DRAWINGS

The disclosure may be easily understood based on the following detailed descriptions in conjunction with the attached drawings, and reference numerals denote structural elements.

BEST MODE

According to an aspect of the disclosure, a method of classifying a sentence into a class by using a deep neural network includes training a first feature vector by using a first neural network and using a first sentence including one or more words, and a first class to which the first sentence belongs, as input data, training a second feature vector by using a second neural network and using a second sentence and a second class to which the second sentence belongs, as input data, obtaining a contrastive loss by quantifying a representational similarity between the first and second sentences based on the first feature vector, the second feature vector, and information about whether the first class is the same as the second class, and repeating the trainings using the first and second neural networks, in such a manner that the contrastive loss has a maximum value.

For example, the method may further include receiving an utterance input from a user, recognizing the received utterance as a sentence, and extracting one or more words included in the recognized sentence, and transforming the one or more words into one or more word vectors, and the training of the first feature vector may include generating a sentence vector by arranging the one or more word vectors in a form of a matrix, and training the first feature vector by inputting the sentence vector to the first neural network as input data.

For example, a plurality of sentences and a plurality of classes to which the plurality of sentences belong may be stored in a database, and the second sentence and the second class may be randomly extracted from the database.

For example, the obtaining of the contrastive loss may include calculating the contrastive loss by using a dot product of the first and second feature vectors and an equation for indicating, as a number, the information about whether the first class is the same as the second class.

For example, the equation may output 1 when the first class is the same as the second class, and output 0 when the first class is not the same as the second class.

For example, the training of the first feature vector may include transforming the first sentence into a matrix including one or more word vectors, inputting the transformed matrix to a convolutional neural network (CNN) as input data and generating feature maps by applying a plurality of filters, and extracting the first feature vector by passing the feature maps through a max pooling layer.

For example, the method may further include transforming the first feature vector into a 1-dimensional vector by inputting the first feature vector to a fully connected layer, and obtaining a first classification prediction value indicating a probability distribution of classifying the first sentence into the first class, by inputting the 1-dimensional vector to a softmax classifier.

For example, the method may further include obtaining a first classification loss corresponding to a difference between the first classification prediction value and the first class, obtaining a second classification prediction value indicating a probability distribution of classifying the second sentence into the second class, by using the second neural network, and obtaining a second classification loss corresponding to a difference between the second classification prediction value and the second class, and calculating a total loss by summing the first classification loss, the second classification loss, and the contrastive loss, and adjusting weights applied to the first and second neural networks, based on the calculated total loss.

For example, the training using the first neural network and the training using the second neural network may be simultaneously performed.

According to another aspect of the disclosure, an electronic device for classifying a sentence into a class by using a deep neural network. The electronic device includes a processor configured to perform training by using a neural network, and the processor is further configured to train a first feature vector by using a first neural network and using a first sentence including one or more words, and a first class to which the first sentence belongs, as input data, train a second feature vector by using a second neural network and using a second sentence and a second class to which the second sentence belongs, as input data, obtain a contrastive loss by quantifying a representational similarity between the first and second sentences based on the first feature vector, the second feature vector, and information about whether the first class is the same as the second class, and repeat the trainings using the first and second neural networks, in such a manner that the contrastive loss has a maximum value.

For example, the electronic device may further include an utterance inputter configured to receive an utterance input from a user, and the processor may be further configured to recognize the received utterance as a sentence, and extract one or more words included in the recognized sentence, and transform the one or more words into one or more word vectors.

For example, the processor may be further configured to generate a sentence vector by arranging the one or more word vectors in a form of a matrix, and train the first feature vector by inputting the sentence vector to the first neural network as input data.

For example, the electronic device may further include a database storing a plurality of sentences and a plurality of classes to which the plurality of sentences belong, and the processor may be further configured to randomly extract the second sentence and the second class from the database and input the second sentence and the second class to the second neural network as input data.

For example, the processor may be further configured to calculate the contrastive loss by using a dot product of the first and second feature vectors and an equation for indicating, as a number, the information about whether the first class is the same as the second class.

For example, the equation may output 1 when the first class is the same as the second class, and output 0 when the first class is not the same as the second class.

For example, the processor may be further configured to transform the first sentence into a matrix including one or more word vectors, input the transformed matrix to a convolutional neural network (CNN) as input data and generate feature maps by applying a plurality of filters, and extract the first feature vector by passing the feature maps through a max pooling layer.

For example, the processor may be further configured to transform the first feature vector into a 1-dimensional vector by inputting the first feature vector to a fully connected layer, and obtain a first classification prediction value indicating a probability distribution of classifying the first sentence into the first class, by inputting the 1-dimensional vector to a softmax classifier.

For example, the processor may be further configured to obtain a first classification loss corresponding to a difference between the first classification prediction value and the first class, obtain a second classification prediction value indicating a probability distribution of classifying the second sentence into the second class, by using the second neural network, and obtain a second classification loss corresponding to a difference between the second classification prediction value and the second class, and calculate a total loss by summing the first classification loss, the second classification loss, and the contrastive loss, and adjust weights applied to the first and second neural networks, based on the calculated total loss.

For example, the processor may be further configured to simultaneously perform the training using the first neural network and the training using the second neural network.

According to another aspect of the disclosure, a computer program product includes a computer-readable recording medium, the computer-readable recording medium including instructions executed to train a first feature vector by using a first neural network and using a first sentence including one or more words, and a first class to which the first sentence belongs, as input data, train a second feature vector by using a second neural network and using a second sentence and a second class to which the second sentence belongs, as input data, obtain a contrastive loss by quantifying a representational similarity between the first and second sentences based on the first feature vector, the second feature vector, and information about whether the first class is the same as the second class, and repeat the trainings using the first and second neural networks, in such a manner that the contrastive loss has a maximum value.

MODE OF DISCLOSURE

This application is based on and claims the benefit of U.S. Provisional Patent Application No. 62/506,724, filed on May 16, 2017, in the United States Patent and Trademark Office, and claims priority under 35 U.S.C. § 119 to Korean Patent Application No. 10-2018-0055651, filed on May 15, 2018, in the Korean Intellectual Property Office, the disclosures of which are incorporated herein by reference in their entirety.

Although the terms used in the following description are selected, as much as possible, from general terms that are widely used at present while taking into consideration the functions obtained in accordance with the embodiments, these terms may be replaced by other terms based on intentions of one of ordinary skill in the art, customs, emergence of new technologies, or the like. In a particular case, terms that are arbitrarily selected by the applicant may be used and, in this case, the meanings of these terms may be described in relevant parts of the disclosure. Therefore, it is noted that the terms used herein are construed based on practical meanings thereof and the whole content of this specification, rather than being simply construed based on names of the terms.

It will be understood that the terms "comprises", "comprising", "includes" and/or "including", when used herein, specify the presence of stated elements, but do not preclude the presence or addition of one or more other elements. The term " . . . unit" or " . . . module" is used to denote an entity for performing at least one function or operation, and may be implemented as hardware, software, or a combination of hardware and software.

Hereinafter, the disclosure will be described in detail by explaining embodiments of the disclosure with reference to the attached drawings. The disclosure may, however, be embodied in many different forms and is not construed as being limited to the embodiments set forth herein.

Reference will now be made in detail to embodiments, examples of which are illustrated in the accompanying drawings.

Figure 1:
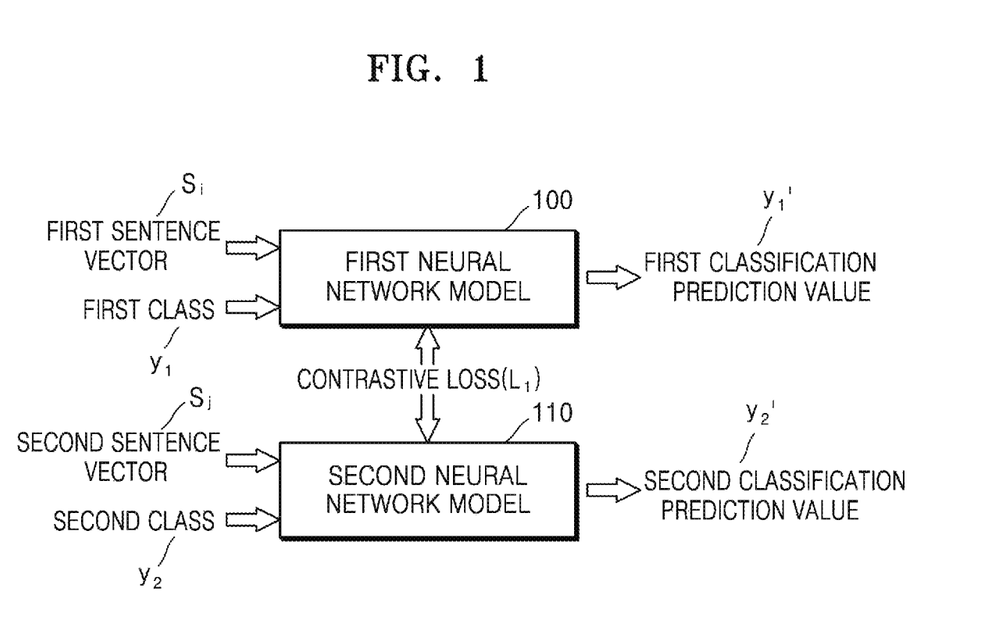
FIG. 1 is a conceptual view for describing an example of obtaining classification prediction values of classes to which sentences belong, by training neural network models by inputting sentence vectors and classes to the neural network models, according to an embodiment of the disclosure.

FIG. 1 is a conceptual view for describing an example of obtaining first and second classification prediction values $y_1'$ and $y_2'$ of classes to which sentences belong, by training first and second neural network models 100 and 110 by inputting first and second sentence vectors $S_i$ and $S_j$ and first and second classes $y_1$ and $y_2$ to the first and second neural network models 100 and 110, according to an embodiment of the disclosure.

An artificial intelligence (AI) algorithm including a deep neural network or the like is characterized in that input data is input to an artificial neural network (ANN) and output data output through operation such as convolution is trained. The ANN may refer to a computational architecture that models a biological brain. In the ANN, nodes corresponding to neurons of a brain are connected to each other and collectively operate to process input data. In a feed-forward neural network, neurons of the neural network have links to other neurons. Such links may extend through the neural network in one direction, e.g., in a forward direction.

Referring to FIG. 1, the first sentence vector $S_i$ and the first class $y_1$ may be input to the first neural network model 100 as input data, and the first classification prediction value $y_1'$ may be output through training using the first neural network model 100. The second sentence vector $S_j$ and the second class $y_2$ may be input to the second neural network model 110 as input data, and the second classification prediction value $y_2'$ may be output through training using the second neural network model 110.

The first and second neural network models 100 and 110 illustrated in FIG. 1 may be implemented as convolutional neural network (CNN) models, but are not limited thereto. In an embodiment, the first and second neural network models 100 and 110 may be implemented as ANN models, e.g., recurrent neural network (RNN), deep belief network (DBN), or restricted Boltzmann machine (RBM) models, or be implemented as machine learning models, e.g., support vector machine (SVM) models.

The first and second sentence vectors $S_i$ and $S_j$ may be generated by parsing and extracting one or more words included in a sentence or utterance input by a user, and transforming the extracted words into vectors, based on natural language processing (NLP) technology. In an embodiment, the first and second sentence vectors $S_i$ and $S_j$ may be generated using a machine learning model for embedding words as vectors, e.g., word2vec, GloVe, or one-hot, but are not limited thereto. The first and second sentence vectors $S_i$ and $S_j$ may be generated by arranging one or more word vectors in the form of a matrix.

The first and second classes $y_1$ and $y_2$ may respectively be vectors for defining classes to which the first and second sentence vectors $S_i$ and $S_j$ belong. Herein, a class does not refer to a hierarchy but may refer to a classified category to which a sentence belongs, e.g., politics, society, economy, culture, entertainment, or information technology (IT).

The first classification prediction value $y_1'$ is resultant data output due to the training using the first neural network model 100, and may refer to a probability of classifying the first sentence vector $S_i$ trained using the first neural network model 100, into the first class $y_1$. For example, when the first class $y_1$ corresponding to a 'politics' category has a value of (1, 0, 0) and the first classification prediction value $y_1'$ has a value of (0.9, 0.05, 0.05), a first sentence corresponding to the first sentence vector $S_i$ may be classified into a sentence related to 'politics'. The second classification prediction value $y_2'$ is a resultant value output due to the training using the second neural network model 110, and may refer to a probability of classifying the second sentence vector $S_j$ trained using the second neural network model 110, into the second class $y_2$. A first classification loss may be obtained by calculating a difference between the first classification prediction value $y_1'$ and the first class $y_1$. Likewise, a second classification loss may be obtained by calculating a difference between the second classification prediction value $y_2'$ and the second class $y_2$.

In an embodiment, the first and second neural network models 100 and 110 may be configured as CNN models. The first and second sentence vectors $S_i$ and $S_j$ may be respectively convoluted using the first and second neural network models 100 and 110 through a plurality of filters having different widths, and a first feature vector and a second feature vector may be trained. A contrastive loss $L_1$ may be obtained based on the first feature vector trained using the first neural network model 100, the second feature vector trained using the second neural network model 110, and information about whether the first class $y_1$ is the same as the second class $y_2$. In an embodiment, the contrastive loss $L_1$ may be calculated using a dot product of the first and second feature vectors and an equation for indicating, as a number, the information about whether the first class $y_1$ is the same as the second class $y_2$. The contrastive loss $L_1$ will be described in detail below with reference to FIG. 4.

In an embodiment, the contrastive loss $L_1$ may have a value ranging from −1 to 1. In an embodiment of the disclosure, the training using the first and second neural network models 100 and 110 may be repeated in a direction in which the contrastive loss $L_1$ has a maximum value. Herein, the repetition of the training may refer to adjusting of weights applied to the first and second neural network models 100 and 110.

In general text classification based on a deep neural network, classification is performed by making one loss function through training using one neural network model based on a label of a sentence to be trained. Therefore, when an utterance to be classified does not correspond to any class of a classification model, misclassification may easily occur. In addition, due to classification based on labels, similar representations belonging to different classes may be easily misclassified. For example, when a user inputs an utterance of "Send a 'KaKaoTalk' message to 'XXX'", the utterance may be misclassified into "Send a 'text' message to 'XXX'".

An embodiment of the disclosure provides a method and apparatus capable of classifying the first class $y_1$ to which the first sentence belongs, by determining a representational similarity between the first sentence and the second sentence through training using the first neural network model 100, training using the second neural network model 110, and calculation of the contrastive loss $L_1$ based on the first feature vector trained using the first neural network model 100, the second feature vector trained using the second neural network model 110, and information about whether the first class $y_1$ is the same as the second class $y_2$ to which the second sentence belongs. Therefore, the method and apparatus according to an embodiment of the disclosure may increase accuracy of text classification for similar sentences belonging to different classes, by using not only a label of a sentence or an utterance but also a semantic similarity to another sentence.

Figure 2:
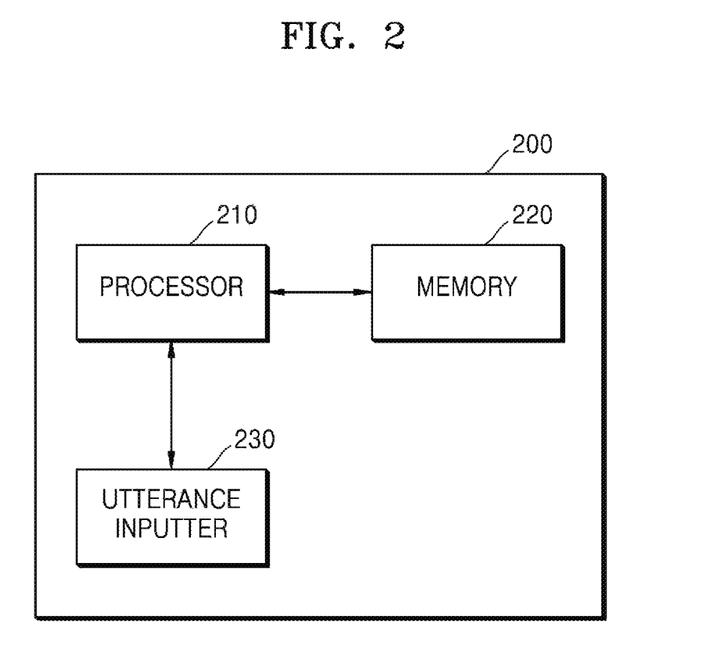
FIG. 2 is a block diagram of an electronic device according to an embodiment of the disclosure.

FIG. 2 is a block diagram of an electronic device 200 according to an embodiment of the disclosure. The electronic device 200 may be a device for performing training to classify a class to which a sentence belongs, by using a neural network model. The electronic device 200 may be a stationary or mobile device implemented as a computer device. The electronic device 200 may include, for example, at least one of a smartphone, a cellular phone, a navigation system, a personal computer, a laptop computer, a digital broadcast device, a personal digital assistant (PDA), a portable multimedia player (PMP), and a tablet PC, but is not limited thereto. The electronic device 200 may communicate with another electronic device and/or a server through a network in a wireless or wired manner.

Referring to FIG. 2, the electronic device 200 may include a processor 210, a memory 220, and an utterance inputter 230.

The processor 210 may be configured to process instructions of a computer program by performing arithmetic (e.g., convolution), logic, and input/output operations. The instructions may be provided to the processor 210 by the memory 220. In an embodiment, the processor 210 may be configured to execute instructions received based on a program code stored in a recording device such as the memory 220. The processor 210 may be configured as, for example, at least one of a central processing unit, a microprocessor, and a graphic processing unit, but is not limited thereto. In an embodiment, when the electronic device 200 is a mobile device such as a smartphone or a tablet PC, the processor 210 may be an application processor (AP) for executing applications.

The processor 210 may perform training by using a general-purpose AI algorithm based on a deep neural network, e.g., a neural network model.

The processor 210 may perform NLP by, for example, extracting words from an utterance or a question sentence of a user, transforming the extracted words into word vectors, and generating a sentence vector. The processor 210 may parse word objects by objectifying a sentence, perform stop word removal (e.g., article filtering) and tokenization (e.g., tense or plural form agreement), extract highly relevant keywords based on appearances thereof, and manage the keywords as independent entities.

In an embodiment, the processor 210 may train a first feature vector by using a first neural network and using a first sentence including one or more words, and a first class to which the first sentence belongs, as input data, and train a second feature vector by using a second neural network and using a second sentence and a second class to which the second sentence belongs, as input data. Herein, the first sentence may be a sentence or utterance input by the user, and the second sentence may be a sentence randomly extracted from among a plurality of sentences stored in a server or a database.

The processor 210 may obtain a contrastive loss by quantifying a representational similarity between the first and second sentences based on the first feature vector, the second feature vector, and information about whether the first class is the same as the second class. In an embodiment, the processor 210 may calculate the contrastive loss by using a dot product of the first and second feature vectors and an equation for indicating, as a number, the information about whether the first class is the same as the second class. The method of calculating the contrastive loss will be described in detail below with reference to FIG. 4.

In an embodiment, the contrastive loss may have a value ranging from −1 to 1, and the processor 210 may repeatedly perform the training using the first and second neural networks, in such a manner that the obtained contrastive loss has a maximum value.

In an embodiment, the processor 210 may simultaneously perform the training using the first neural network and the training using the second neural network.

The electronic device 200 may further include the utterance inputter 230 for receiving an utterance or sentence input from the user. The utterance inputter 230 may include a speech recognition module capable of recognizing speech of the user, but is not limited thereto. The utterance inputter 230 may be configured as a hardware module capable of receiving a sentence input by the user, e.g., a keypad, a mouse, a touchpad, a touchscreen, or a jog switch. The processor 210 may recognize the utterance input through the utterance inputter 230, as a sentence, parse and extract one or more words included in the recognized sentence, and transform the one or more extracted words into one or more word vectors. In an embodiment, the processor 210 may embed words as vectors by using a machine learning model such as word2vec, GloVe, or one-hot, but is not limited thereto. The processor 210 may transform word representations into vectors which may be expressed on a vector space, by using the machine learning model.

The processor 210 may generate a sentence vector by arranging the one or more word vectors in the form of a matrix, and train the first feature vector by inputting the sentence vector to the first neural network as input data. In an embodiment, the processor 210 may transform the first sentence into a matrix including one or more word vectors, input the transformed matrix to a CNN as input data, generate feature maps by applying a plurality of filters, and extract the first feature vector by passing the feature maps through a max pooling layer.

In an embodiment, the processor 210 may transform the first feature vector into a 1-dimensional vector by inputting the first feature vector to a fully connected layer, and obtain a first classification prediction value indicating a probability distribution of classifying the first sentence into the first class, by inputting the 1-dimensional vector to a softmax classifier. Likewise, the processor 210 may train and extract the second feature vector, transform the second feature vector into a 1-dimensional vector by inputting the second feature vector to a fully connected layer, and obtain a second classification prediction value indicating a probability distribution of classifying the second sentence into the second class, by inputting the 1-dimensional vector to a softmax classifier. A detailed description thereof will be provided below with reference to FIG. 4.

The processor 210 may obtain a first classification loss corresponding to a difference between the first classification prediction value and the first class, and obtain a second classification loss corresponding to a difference between the second classification prediction value and the second class. The processor 210 may calculate a total loss by summing the first classification loss, the second classification loss, and the contrastive loss, and repeat training for adjusting weights applied to the first and second neural networks, based on the calculated total loss.

The memory 220 is a computer-readable recording medium and may include a permanent mass storage device such as random access memory (RAM), read-only memory (ROM), or a disk drive. The memory 220 may store an operating system (OS) or at least one computer program code (e.g., a code for a training program executed by the processor 210 by using a neural network). Instead of being stored in the memory 220, the computer program code may be loaded from a separate computer-readable recording medium or a computer program product. The computer-readable recording medium may include a computer-readable recording medium such as a floppy drive, a disk, tape, a DVD/CD-ROM drive, or a memory card. In an embodiment, the computer program code may be installed in the electronic device 200 by using files provided from a server through a network, and be loaded from the memory 220.

Although not shown in FIG. 2, the electronic device 200 may include a database. The database may store a plurality of sentences, and a plurality of classes to which the plurality of sentences belong. In an embodiment, the database may be included in the electronic device 200 as a component, but is not limited thereto. The database may also be configured in the form of a server provided outside the electronic device 200. In an embodiment, the processor 210 may randomly extract the second sentence and the second class from the database and perform training by inputting the second sentence and the second class to the second neural network as input data.

Figure 3:
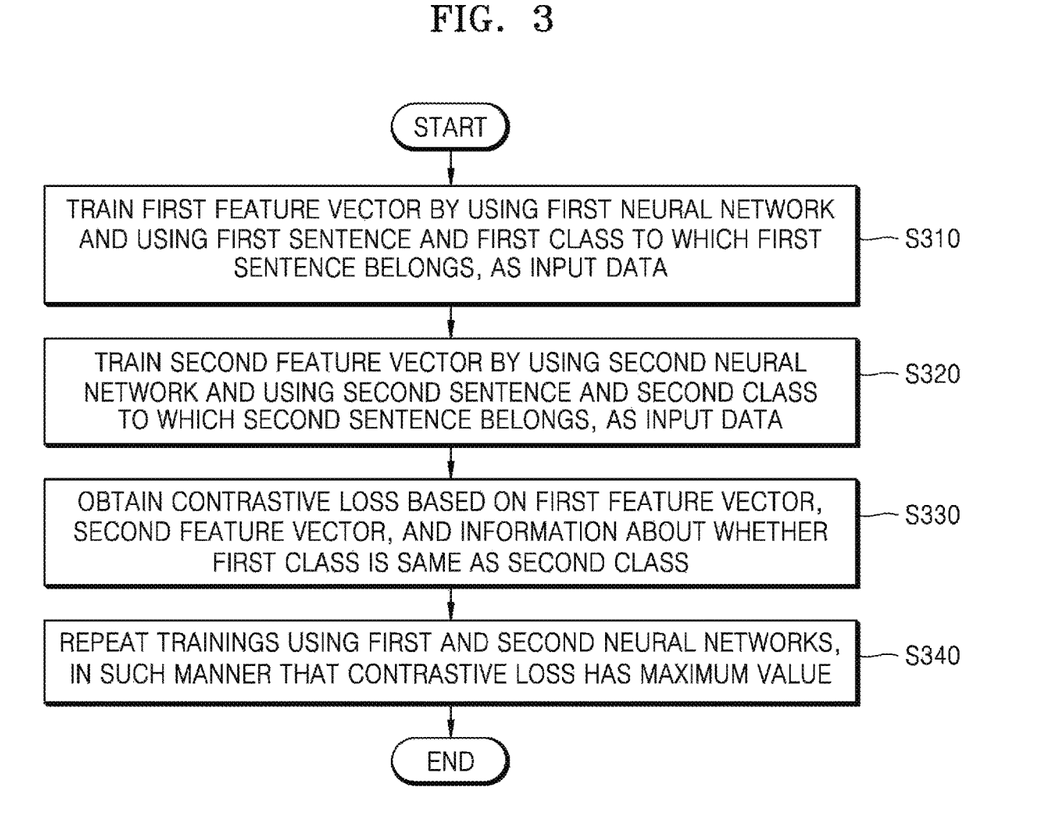
FIG. 3 is a flowchart of a method, performed by an electronic device, of classifying a sentence into a class, according to an embodiment of the disclosure.

FIG. 3 is a flowchart of a method, performed by an electronic device, of classifying a sentence into a class, according to an embodiment of the disclosure.

In operation S310, the electronic device trains a first feature vector by using a first neural network and using a first sentence and a first class to which the first sentence belongs, as input data. In an embodiment, the electronic device may receive an utterance or question input from a user, and recognize the received utterance or question as a sentence. The electronic device may parse one or more words included in the recognized sentence, and transform the one or more words into one or more word vectors, by using NLP technology. In an embodiment, the electronic device may embed the one or more words as the one or more word vectors by using a machine learning model such as word2vec, GloVe, or one-hot, but is not limited thereto. The electronic device may transform word representations into vectors which may be expressed on a vector space, by using the machine learning model.

In an embodiment, the electronic device may generate a sentence vector by arranging the one or more embedded word vectors in the form of a matrix, and train a probability distribution of classifying the first sentence into the first class, by inputting the generated sentence vector to the first neural network as input data.

In operation S320, the electronic device trains a second feature vector by using a second neural network and using a second sentence and a second class to which the second sentence belongs, as input data. In an embodiment, the second sentence and the second class to which the second sentence belongs may be stored in the form of a database. The electronic device may randomly extract the second sentence and the second class from the database and perform training by inputting the second sentence and the second class to the second neural network as input data. Operation S320 is performed after operation S310 in FIG. 3, but is not limited thereto. The electronic device may simultaneously perform operation S310 for training the first feature vector, and operation S320 for training the second feature vector.

In operation S330, the electronic device obtains a contrastive loss based on the first feature vector, the second feature vector, and information about whether the first class is the same as the second class. In an embodiment, the contrastive loss may be calculated using a dot product of the first and second feature vectors and an equation for indicating, as a number, the information about whether the first class $y_1$ is the same as the second class $y_2$. The equation may output 1 when the first class is the same as the second class, or output 0 when the first class is not the same as the second class. An embodiment of calculating the contrastive loss will be described in detail below with reference to FIG. 4.

In operation S340, the electronic device repeats the trainings using the first and second neural networks, in such a manner that the contrastive loss has a maximum value. In an embodiment, the contrastive loss may have a value ranging from −1 to 1. The electronic device may repeat the training using the first and second neural network models, in a direction in which the contrastive loss has a maximum value. Herein, the repetition of the training may refer to adjusting of weights applied to the first and second neural network models.

Figure 4:
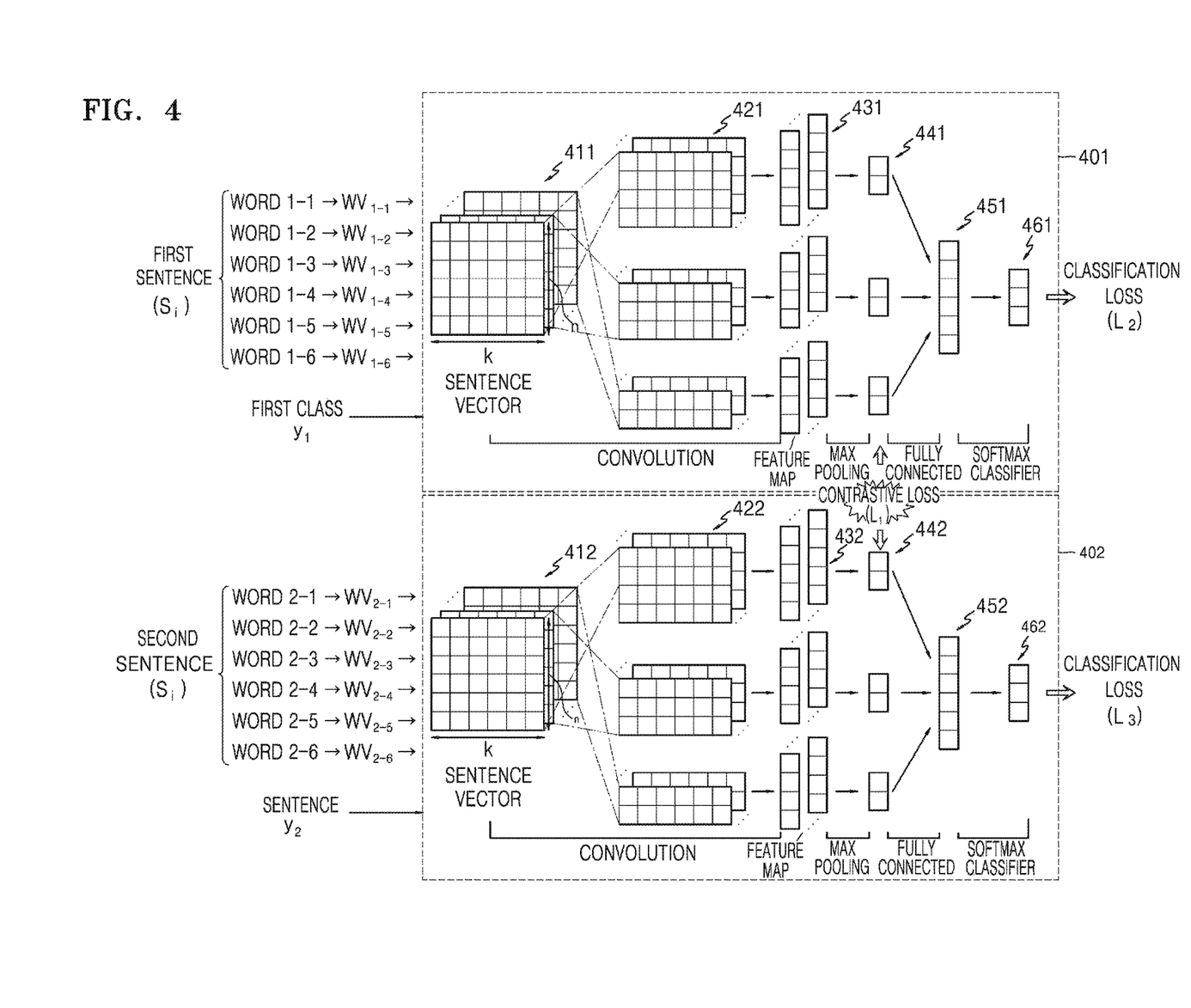
FIG. 4 is a diagram for describing a method, performed by an electronic device, of classifying a sentence into a class by using a convolutional neural network (CNN), according to an embodiment of the disclosure.

FIG. 4 is a diagram for describing a method, performed by an electronic device, of classifying a sentence into a class by using a CNN, according to an embodiment of the disclosure.

Referring to FIG. 4, the electronic device may train a probability distribution of classifying a first sentence $S_i$ into a first class $y_1$, by inputting the first sentence $S_i$ and the first class $y_1$ to a first neural network 401 as input data. In addition, the electronic device may train a probability distribution of classifying a second sentence $S_j$ into a second class $y_2$, by inputting the second sentence $S_j$ and the second class $y_2$ to a second neural network 402 as input data. Herein, the first and second classes $y_1$ and $y_2$ may respectively be vectors for defining classes to which the first and second sentences $S_i$ and $S_j$ belong.

The first and second neural networks 401 and 402 may be configured as CNN models in FIG. 4, but are not limited thereto. In an embodiment, the first and second neural networks 401 and 402 may be implemented as ANN models, e.g., RNN, DBN, or RBM models, or be implemented as machine learning models, e.g., SVM models.

The electronic device may parse the first sentence $S_i$ into the plurality of words word 1-1 to word 1-6, and extract the plurality of words word 1-1 to word 1-6, based on NLP technology. Although six words such as word 1-1 to word 1-6 are illustrated in FIG. 4, six is an example and the number of words included in the first sentence $S_i$ is not limited to six.

The electronic device may transform the plurality of words word 1-1 to word 1-6 into a plurality of word vectors wv1-1 to wv1-6. In an embodiment, the electronic device may embed the plurality of words word 1-1 to word 1-6 as the plurality of word vectors wv1-1 to wv1-6 by using a machine learning model such as word2vec, GloVe, or one-hot.

The electronic device may generate a sentence vector 411 by arranging the plurality of transformed word vectors wv1-1 to wv1-6 in the form of a matrix, and input the sentence vector 411 to the first neural network 401. The sentence vector 411 may be an n×k matrix having n words and k dimensions.

The electronic device may perform convolution by applying a plurality of filters 421 having different widths, to the sentence vector 411, and thus generate feature maps 431. The plurality of filters 421 may be vectors having different weights, and values of the weights may vary based on repetition of training. The electronic device may generate the feature maps 431 by multiplying the sentence vector 411 by the weights of the plurality of filters 421, and adding the multiplied values. The plurality of filters 421 have widths of 2, 3, and 4 in FIG. 4, but are not limited thereto. The plurality of filters 421 may have the same dimensions k as the sentence vector 411.

The electronic device may subsample the feature maps 431 by passing the feature maps 431 through a max pooling layer, and thus generate a first feature vector 441. The first feature vector 441 is a single feature vector generated by extracting only maximum vector values of the feature maps 431 through the max pooling layer, and may be defined as a representation vector indicating a representation of the first sentence Si. Although the first feature vector 441 is generated through the max pooling layer in FIG. 4, the max pooling layer may be replaced by another subsampling layer. For example, the electronic device may generate the first feature vector 441 through an average pooling layer or a L2-norm pooling layer.

The electronic device may concatenate values of the first feature vector 441 by inputting the first feature vector 441 to a fully connected layer, and thus generate a 1-dimensional vector 451. The electronic device may generate a first classification prediction value vector 461 by inputting the 1-dimensional vector 451 to a softmax classifier. The first classification prediction value vector 461 may indicate a probability distribution of classifying the first sentence Si into the first class y1. Herein, the electronic device may perform dropout to prevent overfitting caused during adjustment of the weights.

The electronic device may generate a second feature vector 442 by inputting the second sentence Sj and the second class y2 to the second neural network 402 as input data, and thus generate a second classification prediction value vector 462. A training method using the second neural network 402 is the same as the training method using the first neural network 401, except for input data and a training result, and thus a repeated description will not be provided herein.

The electronic device may obtain a contrastive loss L1 by quantifying a representational similarity between the first and second sentences Si and Sj based on the first feature vector 441, the second feature vector 442, and information about whether the first class y1 is the same as the second class y2. When the first feature vector 441 is defined as F($S_i$) and the second feature vector 442 is defined as F(Sj), the contrastive loss L1 may be calculated based on Equation 1.

$$L_1 = Y \times |F(S_i) \cdot F(S_j)| - (1-Y) \times |F(S_i) \cdot F(S_j)| \quad \text{Equation 1}$$

$$\text{where, } Y = \begin{cases} 1, & y_1 = y_2 \\ 0, & y_1 \neq y_2 \end{cases}$$

Referring to Equation 1, the contrastive loss $L_1$ may be calculated using an absolute value of a dot product of the first and second feature vectors F($S_i$) and F($S_j$), and Y. In Equation 1, Y is a notation for transforming the information about whether the first class $y_1$ is the same as the second class $y_2$, into a number, and may output 1 when the first class $y_1$ is the same as the second class $y_2$, or output 0 when the first class $y_1$ is not the same as the second class $y_2$.

When the first and second sentences $S_i$ and $S_j$ belong to different classes and have similar sentence representations, the contrastive loss $L_1$ may be −1. That is, in Equation 1, Y=0 because the first class $y_1$ is different from the second class $y_2$, an absolute value of a dot product of F($S_i$) and F($S_1$) is close to 1 because the first feature vector F($S_i$) is similar to the second feature vector F($S_1$), and thus the contrastive loss $L_1$ may be calculated as 0×|~1|−(1−0)×|~1|=−1.

When the first and second sentences $S_i$ and $S_j$ belong to different classes and have different sentence representations, the contrastive loss $L_1$ may be 0. That is, Y=0 because the first class $y_1$ is different from the second class $y_2$, and an absolute value of a dot product of F($S_i$) and F($S_j$) may approximate to 0 because the first feature vector F($S_1$) is different from the second feature vector F($S_1$) and a cosine value thereof is close to 0. Therefore, in Equation 1, the contrastive loss $L_1$ may be calculated as 0×|~0|−(1−0)×|~0|=0.

When the first and second sentences $S_i$ and $S_j$ belong to the same class and have different sentence representations, the contrastive loss $L_1$ may be 0. That is, Y=1 because the first class $y_1$ is the same as the second class $y_2$, and an absolute value of a dot product of F($S_i$) and F($S_j$) may approximate to 0 because the first feature vector F($S_i$) is different from the second feature vector F($S_1$) and a cosine value thereof is close to 0. Therefore, in Equation 1, the contrastive loss $L_1$ may be calculated as 1×|~0|−(1−1)×|~0|=0.

When the first and second sentences $S_i$ and $S_j$ belong to the same class and have similar sentence representations, the contrastive loss $L_1$ may be 1. That is, Y=1 because the first class $y_1$ is the same as the second class $y_2$, and an absolute value of a dot product of F($S_i$) and F($S_j$) may approximate to 1 because the first feature vector F($S_i$) is similar to the second feature vector F($S_j$) and a cosine value thereof is close to 1. Therefore, in Equation 1, the contrastive loss $L_1$ may be calculated as 1×|~1|−(1−1)×|<1|=1.

Referring to Equation 1, the contrastive loss $L_1$ may be used not only to determine whether the first and second classes $y_1$ and $y_2$ to which the first and second feature vectors $F(S_i)$ and $F(S_j)$ belong are the same, but also to determine a similarity between the first and second feature vectors $F(S_i)$ and $F(S_j)$.

The electronic device may perform training in a direction in which the contrastive loss $L_1$ has a maximum value. Referring to Equation 1, because the contrastive loss $L_1$ has a value ranging from −1 to 1, when the contrastive loss $L_1$ is −1, the number of training operations may be increased by changing weights of the first and second neural networks 401 and 402. Otherwise, when the contrastive loss $L_1$ is 1, the electronic device may reduce the number of training operations using the first and second neural networks 401 and 402. That is, when the first and second sentences $S_i$ and $S_j$ belong to different classes but have similar representations, the electronic device may increase the number of training operations to distinguish between the two. When the first and second sentences $S_i$ and $S_j$ belong to the same class and have similar representations, the electronic device may not increase the number of training operations.

In an embodiment, the electronic device may obtain a first classification loss $L_2$ corresponding to a difference between the first class $y_1$ and the first classification prediction value vector 461 corresponding to output data of training using the first neural network 401. Likewise, the electronic device may obtain a second classification loss $L_3$ corresponding to a difference between the second class $y_2$ and the second classification prediction value vector 462 corresponding to output data of training using the second neural network 402. The first and second classification losses $L_2$ and $L_3$ may respectively be probabilities of classifying the first and second sentences $S_i$ and $S_j$ into the first and second classes $y_1$ and $y_2$, and smaller values thereof may indicate higher classification accuracies.

In an embodiment, the electronic device may calculate a total loss L by summing the contrastive loss $L_1$, the first classification loss $L_2$, and the second classification loss $L_3$ as shown in Equation 2.

$$L=L_1+L_2+L_3 \qquad \text{Equation 2}$$

The electronic device may perform training for adjusting weights applied to the first and second neural networks 401 and 402, based on the calculated total loss L.

According to the embodiment of the disclosure illustrated in FIG. 4, by considering not only the first and second classification losses $L_2$ and $L_3$ in classification of the first and second sentences $S_i$ and $S_j$ into the first and second classes $y_1$ and $y_2$, but also the contrastive loss $L_1$ based on sentence representations, misclassification of sentences belonging to different classes but having similar representations may be prevented. That is, the electronic device according to an embodiment of the disclosure may train representations capable of effectively distinguishing between similar utterances or sentences belonging to different classes, and thus increase accuracy of utterance or text classification.

In particular, when the electronic device executes a chatbot program such as Bixby, although the first sentence $S_i$ corresponding to an utterance input by a user belongs to the first class $y_1$, the first sentence $S_i$ may be classified into a different class due to a different sentence representation thereof. At this time, the user may receive a misclassified answer other than a desired answer based on the first sentence $S_i$. In this case, the electronic device may increase accuracy of classifying into a class to which a question of the user belongs, by perform training in consideration of the contrastive loss $L_1$. When the first sentence $S_i$ does not belong to any of classes pre-stored in the electronic device, the electronic device may reject classification of the first sentence $S_i$ and thus a probability of receiving an undesired answer by the user may be reduced.

Figure 5:
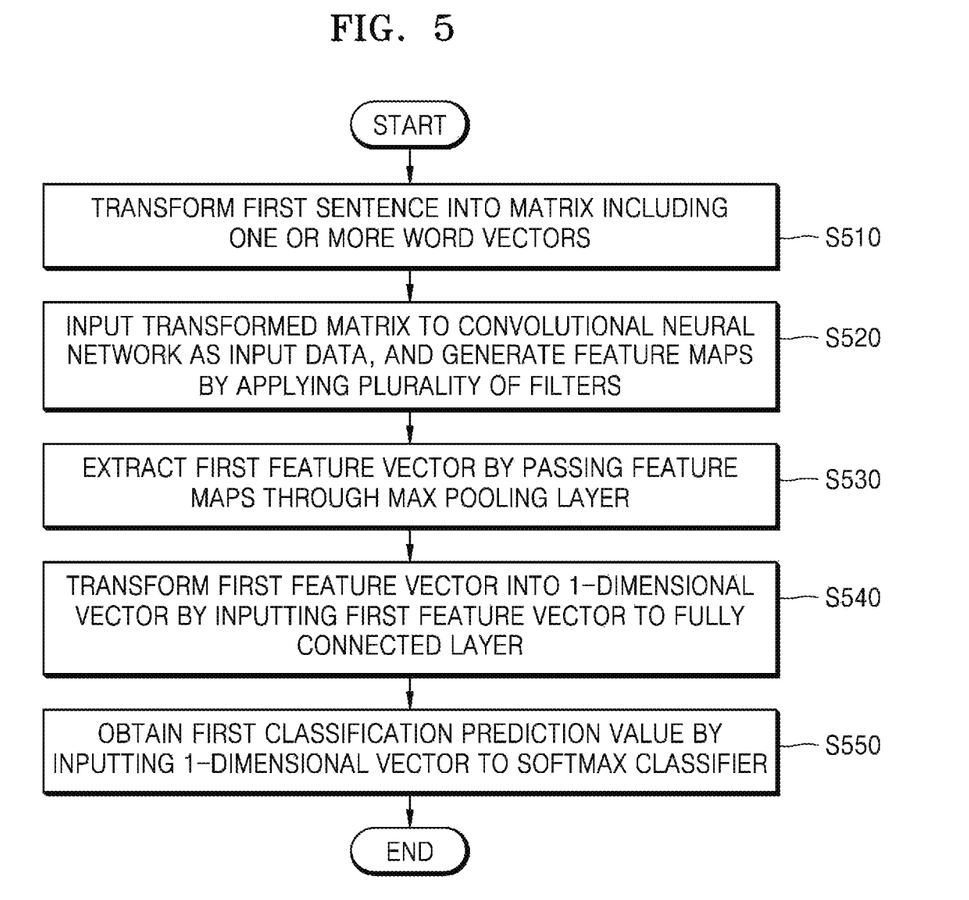
FIG. 5 is a flowchart of a method, performed by an electronic device, of obtaining a classification prediction value corresponding to a probability of classifying a first sentence into a class to which the first sentence belongs, according to an embodiment of the disclosure.

FIG. 5 is a flowchart of a method, performed by an electronic device, of obtaining a classification prediction value corresponding to a probability of classifying a first sentence into a class to which the first sentence belongs, according to an embodiment of the disclosure.

In operation S510, the electronic device transforms the first sentence into a matrix including one or more word vectors. In an embodiment, the first sentence may be an utterance or sentence input by a user. The electronic device may extract one or more words included in the first sentence, and transform the one or more words into one or more word vectors. In an embodiment, the electronic device may embed the one or more words as the one or more word vectors by using a machine learning model such as word2vec, GloVe, or one-hot. The electronic device may generate a first sentence vector by arranging the one or more word vectors in the form of a matrix.

In operation S520, the electronic device inputs the transformed matrix to a CNN as input data, and generates feature maps by applying a plurality of filters. In an embodiment, the electronic device may perform convolution by applying multiple filters having different widths. The multiple filters may be vectors having different weights, and values of the weights may vary based on repetition of training. The multiple filters may have the same dimensions as the first sentence vector generated in operation S510.

In operation S530, the electronic device extracts a first feature vector by passing the feature maps through a max pooling layer. The electronic device may extract the first feature vector corresponding to a single feature vector generated by extracting only maximum vector values from the feature maps through the max pooling layer. However, a layer used for subsampling is not limited to the max pooling layer. In an embodiment, the electronic device may extract the first feature vector through, for example, an average pooling layer or a $L_2$-norm pooling layer.

In operation S540, the electronic device transforms the first feature vector into a 1-dimensional vector by inputting the first feature vector to a fully connected layer. In an embodiment, the electronic device may transform the first feature vector into the 1-dimensional vector by concatenating the values of the first feature vector extracted from a plurality of feature maps generated using filters having different widths. In operation S540, dropout may be used to solve overfitting caused during training of the first feature vector, and to increase accuracy of training data.

In operation S550, the electronic device obtains a first classification prediction value by inputting the 1-dimensional vector to a softmax classifier. In an embodiment, the first classification prediction value refers to a probability of classifying the first sentence into a first class, and may be generated through the softmax classifier. The vector values included in the 1-dimensional vector may be transformed through the softmax classifier into a probability values. The sum of the probability values of each of the vector values is 1.

Although a procedure of obtaining the first classification prediction value by inputting the first sentence to the CNN is illustrated in FIG. 5, the illustrated operations may be equally applied to a second sentence. In an embodiment, the electronic device may obtain a second classification prediction value by inputting the second sentence to a CNN based on operations S510 to S550. In an embodiment, the electronic device may simultaneously perform a first training procedure for obtaining the first classification prediction value, and a second training procedure for obtaining the second classification prediction value.

Figure 6:
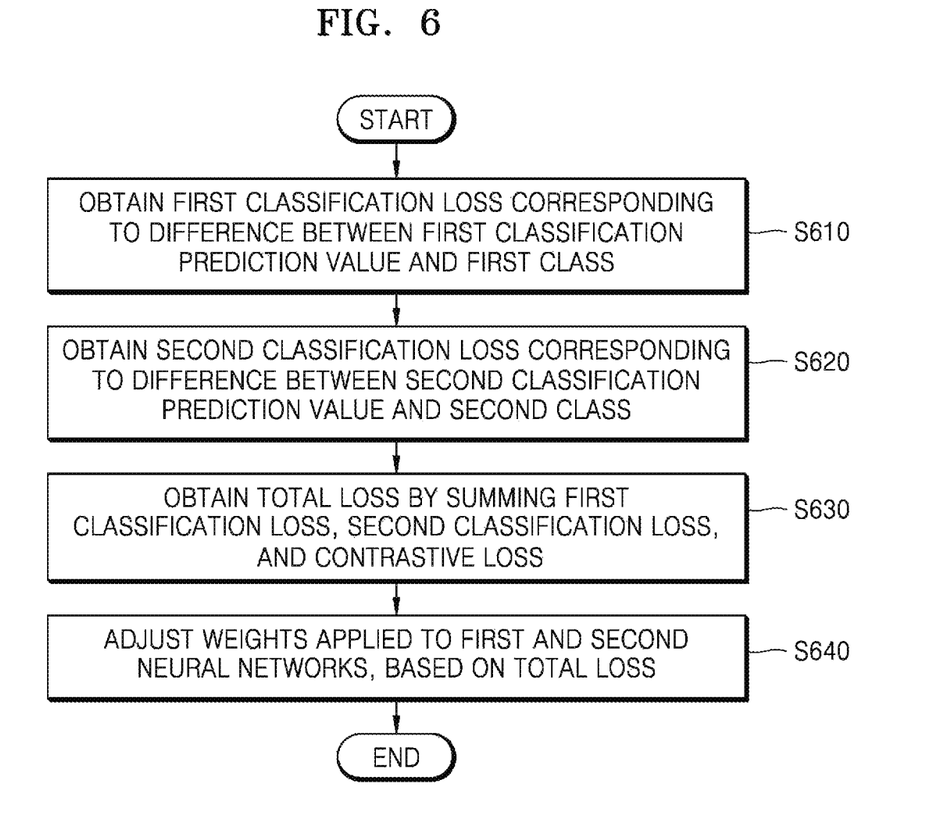
FIG. 6 is a flowchart of a training method, performed by an electronic device, for adjusting weights applied to neural network models, based on losses obtained using the neural network models, according to an embodiment of the disclosure.

FIG. 6 is a flowchart of a training method, performed by an electronic device, for adjusting weights applied to neural network models, based on losses obtained using the neural network models, according to an embodiment of the disclosure.

In operation S610, the electronic device obtains a first classification loss corresponding to a difference between a first classification prediction value and a first class. The first classification loss may refer to a difference between the first class and the first classification prediction value corresponding to a probability of classifying a first sentence into the first class.

In operation S620, the electronic device obtains a second classification loss corresponding to a difference between a second classification prediction value and a second class. The second classification loss may refer to a difference between the second class and the second classification prediction value corresponding to a probability of classifying a second sentence into the second class. In an embodiment, operations S610 and S620 may be simultaneously performed.

In operation S630, the electronic device obtains a total loss by summing the first classification loss, the second classification loss, and a contrastive loss. A method of calculating the contrastive loss is described above in relation to FIG. 4, and thus a repeated description will not be provided herein.

In operation S640, the electronic device adjusts weights applied to first and second neural networks, based on the total loss. In an embodiment, the first and second neural networks may be configured as CNNs for generating feature maps by applying a plurality of filters, and the electronic device may adjust weights of the plurality of filters applied to the CNNs, based on a value of the total loss.

The electronic device described herein may be implemented using hardware components, software components, and/or a combination of hardware and software components. For example, the electronic device described in the embodiments of the disclosure may be implemented using one or more general-purpose or special-purpose computers, e.g., processors, arithmetic logic units (ALUs), digital signal processors, microcomputers, field programmable gate arrays (FPGAs), programmable logic units (PLUs), microprocessors, or any other devices capable of executing and responding to instructions.

The software may include a computer program, codes, instructions, or a combination thereof and configure a processing device to operate as desired or instruct the processing device independently or collectively.

The software may be implemented as a computer program including instructions stored in a computer-readable recording medium. Examples of the computer-readable recording medium include magnetic recording medium (e.g., read-only memory (ROM), random access memory (RAM), floppy disks, and hard disks) and optical recording media (e.g., CD-ROMs and digital versatile discs (DVDs)). The computer-readable recording medium may be distributed over network-coupled computer systems so that computer-readable codes are stored and executed in a distributed fashion. The medium may be read by a computer, stored in memory, and executed by a processor.

The computer is a device capable of fetching instructions stored in the recording medium, and operating according to the embodiments of the disclosure based on the fetched instructions, and may include the electronic device according to the embodiments of the disclosure.

The computer-readable recording medium may be provided in the form of a non-transitory recording medium. When the recording medium is 'non-transitory', it means that the recording medium does not include signals and is tangible, and it does not limit that data is semi-permanently or temporarily stored in the recording medium.

An electronic device or a method according to the embodiments of the disclosure may be included and provided in a computer program product. The computer program product may be traded between a seller and a buyer.

The computer program product may include a software program, and a computer-readable recording medium storing the software program. For example, the computer program product may include a product (e.g., a downloadable application) that is electronically distributed in the form of a software program through a manufacturer of the electronic device or an electronic market (e.g., Google Play Store or App Store). For electronic distribution, at least a part of the software program may be stored in a recording medium or be temporarily generated. In this case, the recording medium may be a server of the manufacturer, a server of the electronic market, or a recording medium of a relay server that temporarily stores the software program.

The computer program product may include a recording medium of a server or a recording medium of a device (e.g., an ultrasonic diagnostic device) in a system including the server and the device. Otherwise, when a third device (e.g., a smartphone) connected to the server or the device is present, the computer program product may include a recording medium of the third device. Alternatively, the computer program product may include a software program itself transmitted from the server to the device or the third device, or from the third device to the device.

In this case, one of the server, the device, and the third device may execute the computer program product to perform the method according to the embodiments of the disclosure. Alternatively, two or more of the server, the device, and the third device may execute the computer program product to perform the method according to the embodiments of the disclosure in a distributed fashion.

For example, the server (e.g., a cloud server or an artificial intelligence (AI) server) may execute the computer program product stored in the server, to control the device connected to the server, to perform the method according to the embodiments of the disclosure.

As another example, the third device may execute the computer program product to control the device connected to the third device, to perform the method according to the embodiments of the disclosure.

When the third device executes the computer program product, the third device may download the computer program product from the server and execute the downloaded computer program product. Alternatively, the third device may execute the computer program product provided in a preloaded state, to perform the method according to the embodiments of the disclosure.

While the disclosure has been particularly shown and described with reference to embodiments thereof, it will be understood by one of ordinary skill in the art that various changes in form and details may be made therein without departing from the scope of the disclosure as defined by the following claims.

The embodiments of the disclosure should be considered in a descriptive sense only and not for purposes of limitation. For example, suitable results may also be achieved when the described techniques are performed in a different order and/or when components of the described electronic device, structure, or circuit are coupled or combined in a different manner or are replaced or substituted by other components or their equivalents.

The invention claimed is:

1. A method of classifying a sentence into a class by using a deep neural network, the method comprising:
training a first feature vector by using a first neural network and using a first sentence comprising one or more words, and a first class to which the first sentence belongs, as input data;
training a second feature vector by using a second neural network and using a second sentence and a second class to which the second sentence belongs, as input data;
obtaining a contrastive loss quantifying a representational similarity between the first and second sentences by using a dot product of the first feature vector and the second feature vector, and an equation for indicating, as a number, information about whether the first class is the same as the second class; and
repeating the trainings using the first and second neural networks, in such a manner that the contrastive loss has a maximum value.

2. The method of claim 1, further comprising:
receiving an utterance input from a user;
recognizing the received utterance as a sentence; and
extracting one or more words comprised in the recognized sentence, and transforming the one or more words into one or more word vectors,
wherein the training of the first feature vector comprises:
generating a sentence vector by arranging the one or more word vectors in a form of a matrix, and
training the first feature vector by inputting the sentence vector to the first neural network as input data.

3. The method of claim 1,
wherein a plurality of sentences and a plurality of classes to which the plurality of sentences belong are stored in a database, and
wherein the second sentence and the second class are randomly extracted from the database.

4. The method of claim 1, wherein the equation outputs 1 when the first class is the same as the second class, and outputs 0 when the first class is not the same as the second class.

5. The method of claim 1, wherein the training using the first neural network and the training using the second neural network are simultaneously performed.

6. An electronic device for classifying a sentence into a class by using a deep neural network, the electronic device comprising
a processor configured to perform training by using a neural network,
wherein the processor is further configured to:
train a first feature vector by using a first neural network and using a first sentence comprising one or more words, and a first class to which the first sentence belongs, as input data,
train a second feature vector by using a second neural network and using a second sentence and a second class to which the second sentence belongs, as input data,
obtain a contrastive loss quantifying a representational similarity between the first and second sentences by using a dot product of the first feature vector and the second feature vector, and an equation for indicating, as a number, information about whether the first class is the same as the second class, and
repeat the trainings using the first and second neural networks, in such a manner that the contrastive loss has a maximum value.

7. The electronic device of claim 6, further comprising an utterance inputter configured to receive an utterance input from a user,
wherein the processor is further configured to recognize the received utterance as a sentence, and extract one or more words comprised in the recognized sentence, and transform the one or more words into one or more word vectors.

8. The electronic device of claim 7, wherein the processor is further configured to generate a sentence vector by arranging the one or more word vectors in a form of a matrix, and train the first feature vector by inputting the sentence vector to the first neural network as input data.

9. The electronic device of claim 6, further comprising:
a database storing a plurality of sentences and a plurality of classes to which the plurality of sentences belong,
wherein the processor is further configured to randomly extract the second sentence and the second class from the database and input the second sentence and the second class to the second neural network as input data.

10. The electronic device of claim 6, wherein the equation outputs 1 when the first class is the same as the second class, and outputs 0 when the first class is not the same as the second class.

11. The electronic device of claim 6, wherein the processor is further configured to transform the first sentence into a matrix comprising one or more word vectors, input the transformed matrix to a convolutional neural network (CNN) as input data, generate feature maps by applying a plurality of filters, and extract the first feature vector by passing the feature maps through a max pooling layer.

12. The electronic device of claim 6, wherein the processor is further configured to simultaneously perform the training using the first neural network and the training using the second neural network.

13. A computer program product comprising a non-transitory computer-readable recording medium,
the non-transitory computer-readable recording medium comprising instructions that are executed to:
train a first feature vector by using a first neural network and using a first sentence comprising one or more words, and a first class to which the first sentence belongs, as input data;
train a second feature vector by using a second neural network and using a second sentence and a second class to which the second sentence belongs, as input data,
obtain a contrastive loss quantifying a representational similarity between the first and second sentences by using a dot product of the first feature vector and the second feature vector, and an equation for indicating, as a number, information about whether the first class is the same as the second class, and
repeat the trainings using the first and second neural networks, in such a manner that the contrastive loss has a maximum value.

* * * * *